United States Patent

[11] 3,624,523

| [72] | Inventor | Joel Katz |
| | | Los Angeles, Calif. |
| [21] | Appl. No. | 862,634 |
| [22] | Filed | Sept. 19, 1969 |
| [45] | Patented | Nov. 30, 1971 |
| [73] | Assignee | Hughes Aircraft Company |
| | | Culver City, Calif. |

[54] DIGITAL FREQUENCY DISCRIMINATOR
4 Claims, 6 Drawing Figs.

| [52] | U.S. Cl. | 328/141, 307/233 |
| [51] | Int. Cl. | H03b 3/04 |
| [50] | Field of Search | 307/233, 295; 328/138, 140, 141 |

[56] References Cited
UNITED STATES PATENTS

| 3,445,685 | 5/1969 | Roth | 328/138 |
| 3,474,341 | 10/1969 | Crafts | 328/140 |
| 3,501,701 | 3/1970 | Reid | 307/295 |
| 3,514,712 | 5/1970 | Sinclair et al. | 307/233 |

Primary Examiner—Rodney D. Bennett, Jr.
Assistant Examiner—N. Moskowitz
Attorneys—James K. Haskell and Robert H. Himes ABSTRACT: The digital discriminator of the present invention provides a linear DC voltage vs. input frequency transfer characteristic utilizing two-level logic circuitry including a shift register in a manner to minimize temperature sensitivity, eliminate need for alignment, and obviating the need for critical or expensive components such as crystals and/or transformers. The device has theoretically perfect response linearity, high reliability, and is adaptable to packaging in microminiature form, thereby requiring less volume than its analog counterparts.

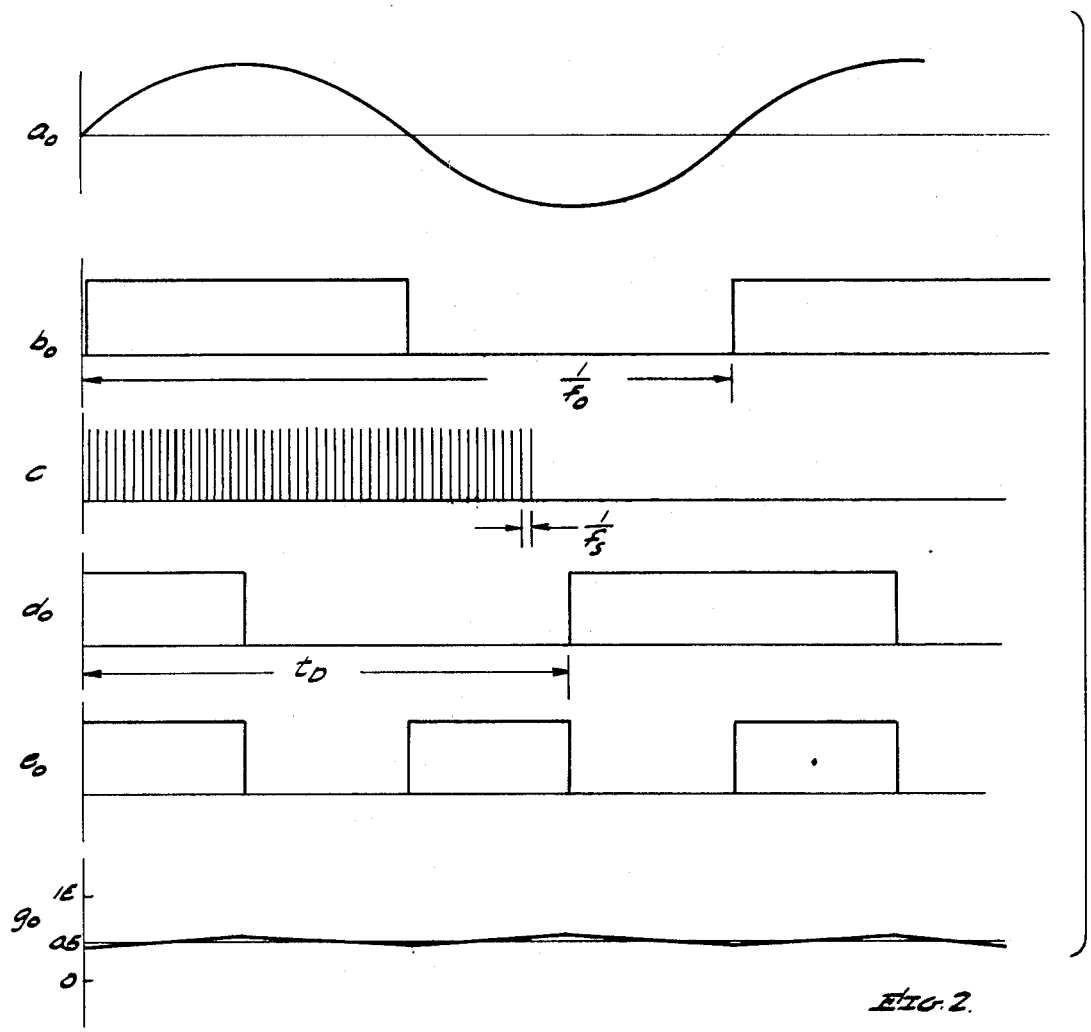
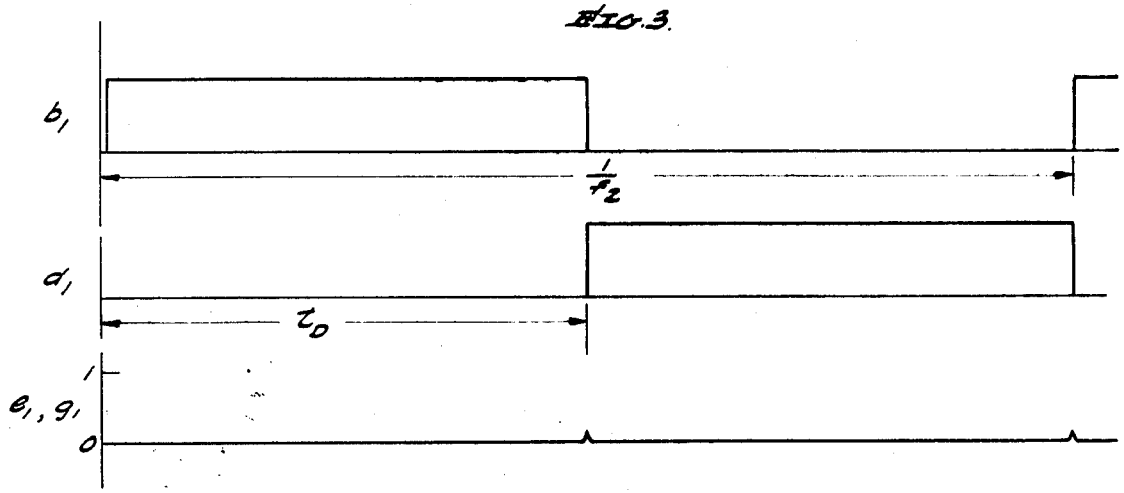

DIGITAL FREQUENCY DISCRIMINATOR

BACKGROUND OF THE INVENTION

Contemporary frequency discriminators include apparatus for converting a signal to a series of pulses and determining the pulse rate. Other types of frequency discriminators include center-tapped tuned transformers with detectors or an analog delay-line version of the present invention.

SUMMARY OF THE INVENTION

In accordance with the present invention, a sinusoidal input signal is first converted to a two-level (single bit quantized) digital form by passing it through a hard limiter. The resulting square wave signal is then applied to a digital delay line composed of shift registers. The output of the digital delay line along with the square wave signal direct from the hard limiter are applied to inputs of a full wave digital phase detector. The output of the phase detector is a pulse train having a duty cycle that varies from 0 to 100 percent as the input frequency is varied. A low-pass filter following the phase detector passes only the average value of the variable duty-cycle pulse train. A continuous change in input frequency causes a linearly changing phase out of the delay line, resulting in a repetitive triangular DC transfer characteristic. The input data band must be band limited so that it does not extend beyond the selected linear segment of the transfer characteristic. The bandwidth and/or center frequency of the discriminator can be changed by changing either or both the shift register clock frequency and/or the number of bits in the shift register. Also, the clock frequency must always be much higher than the highest frequency contained in the input data band in order to minimize clock-pulse phase jitter noise at the output of the shift register.

BRIEF DESCRIPTION OF THE DRAWINGS

FIGS. 2-5 illustrate waveforms for input signals of different frequencies and at various points in the apparatus of FIG. 1.

Referring now to FIG. 1 of the drawings, there is shown a schematic block diagram of the digital frequency discriminator of the present invention. In particular, a shift-register delay line 10 has a synchronization input connected to terminals 11, 12, the latter of which is referenced to ground and, in addition, has an input connected to the output of a hard limiter 13 and an output connected to one input of a digital phase detector 14. The remaining input of digital phase detector 14 is connected directly to the output of the hard limiter 13. The input to the hard limiter 13 is, in turn, connected through a band-pass filter 15 to input terminals 16, 17, the latter of which is referenced to ground. Lastly, the output from the digital phase detector 14 is connected through a low-pass filter 18 to output terminals 19, 20, the latter of which is referenced to ground.

Figure 1:
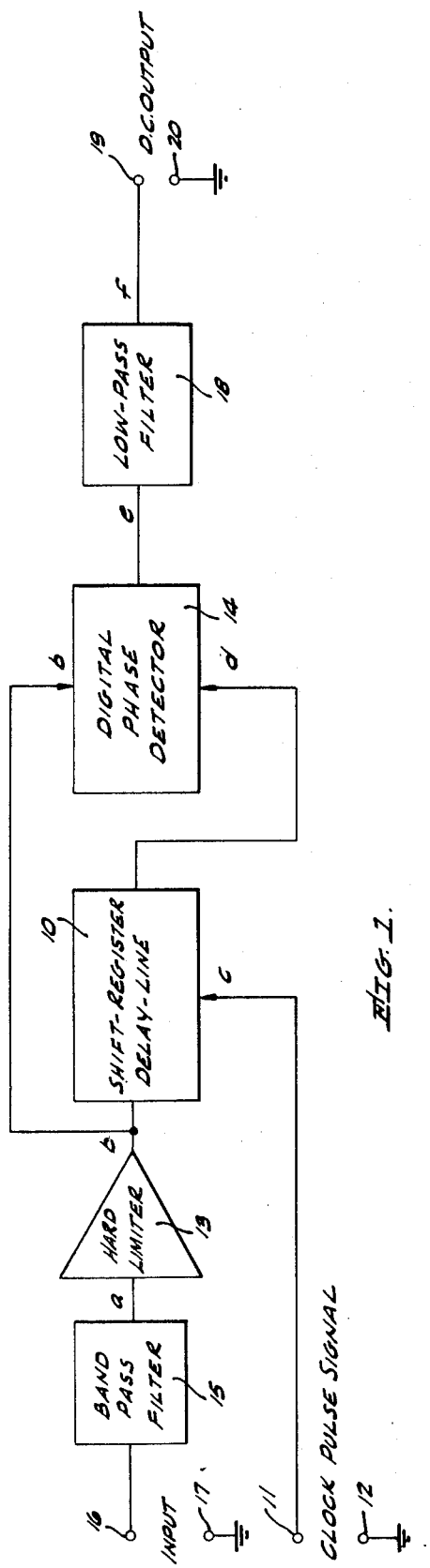
FIG. 1 shows a schematic block diagram of the digital frequency discriminator of the present invention.

In specifying the parameters of the apparatus of FIG. 1, the following definitions apply:

E is the maximum control voltage value on the phase detector transfer characteristic;

$f_o$ is designated as the selected center frequency and corresponds to a point on the phase detector transfer characteristic where the output is ½E;

B is discriminator bandwidth which is the frequency change corresponding to a 180° phase change; and $t_D = N \cdot t_s$ is the delay introduced by the shift-register delay line 10 where N is the number of bits in the shift-register delay line 10; and $t_s$ is the period of the clock pulse signal applied via terminal 11 to the synchronization input of shift-register delay line 10.

In the apparatus of FIG. 1, a signal applied to the input of the hard limiter 13 over the entire lower frequency spectrum generates repetitive triangular transfer characteristics at the output terminal 19. See FIG. 6. The separation between a selected peak and an adjacent null of this characteristic provides the maximum bandwidth, B, of the discriminator. In order to avoid ambiguous signals at the output terminals 19, 20, i.e., signals from more than one peak-to-null interval of the transfer characteristic, FIG. 6, the band-pass filter 15 limits the frequencies applied to the hard limiter 13 to one or less peak-to-null interval of the transfer characteristic.

In operation, the digital phase detector 14 generates an output corresponding to control voltage E when the same voltage is applied to both inputs, irrespective of whether it is zero or at the limited level appearing at the outputs of hard limiter 13 and digital phase detector 14. Thus, maximum output E occurs for phase shifts of $n \cdot 360°$ where $n=0, 1, 2, 3, \ldots$ Minimum output, on the other hand, occurs for phase shifts of $180°+m \cdot 360°$ where $m=0, 1, 2, 3, \ldots$ The delay $t_D$ of the shift-register delay line 10 remains constant and cannot equal zero, as this delay does not generate a variation of phase with frequency. The lowest peak-to-null interval of the transfer characteristic, FIG. 6, occurs between 0° and 180°, i.e., $m=0$ and $n=0$. It is apparent that when the delay $t_D$ equals one-half period of an applied signal the phase shift of the delayed signal is 180°, whereby the frequency corresponds to the first null of the transfer characteristic, FIG. 6. This frequency interval defines the available discriminator bandwidth, B. Increasing the frequency to 2B generates a phase shift of the delayed signal equal to 360°. Hence, $$t_D = 1/2B \quad (1)$$

Figure 6:
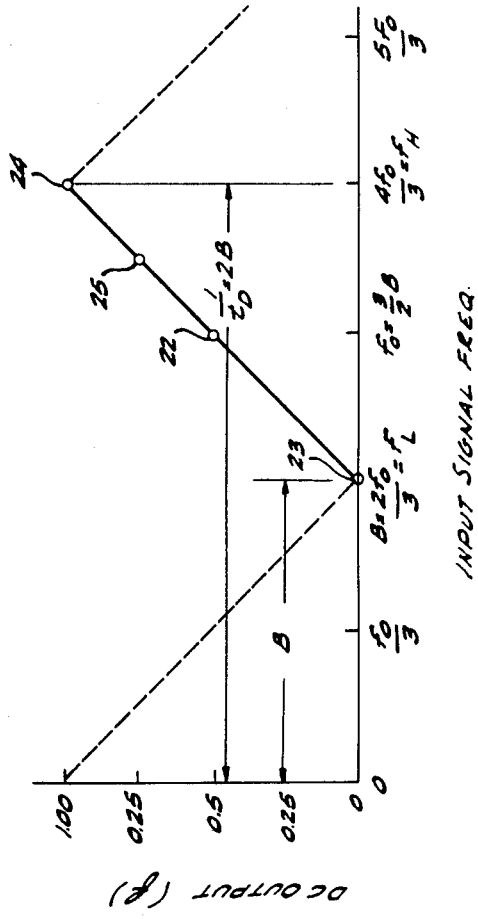
FIG. 6 illustrates the input signal frequency versus DC output voltage characteristic of the apparatus of FIG. 1.
Figure 6:
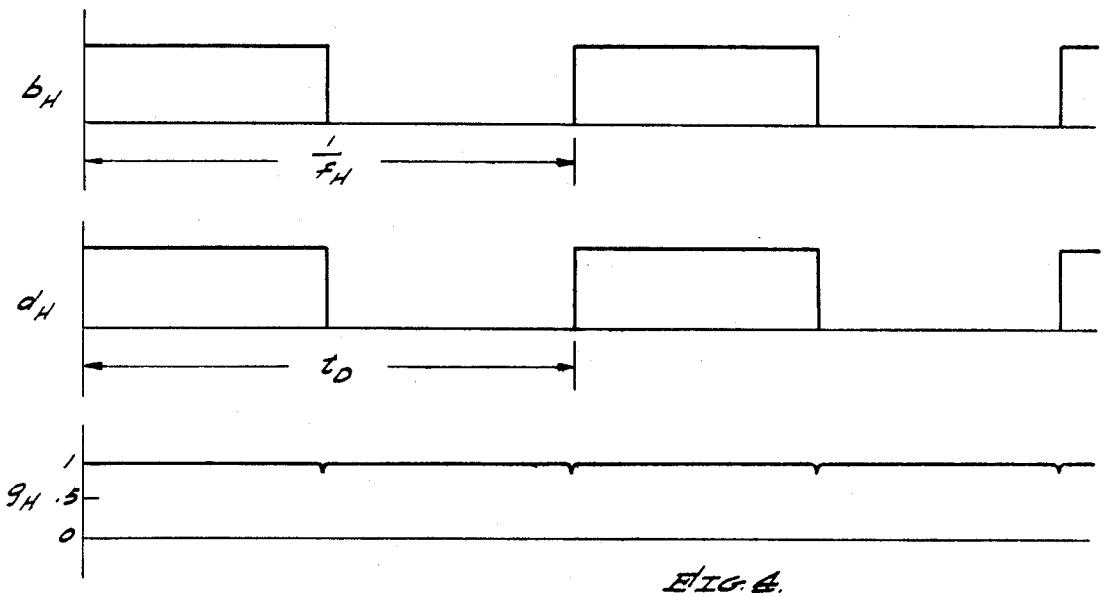

The frequency 2B corresponds to the next adjacent peak of the transfer characteristic, FIG. 6. Thus, permissible choices of center frequency ($f_o$) occur at ½B, 3/2B, 5/2B, ... ½B · p. Hence, $$f_o = \tfrac{1}{2} B \cdot p \quad (2)$$

where $p=1, 3, 5, 7 \ldots = $ a positive odd integer.

The low frequency end of the linear transfer segment for a given $f_o$ is termed $f_L$. Likewise, the upper end of the same segment is termed $f_H$. By definition, $$B = f_H - f_L, \quad (3)$$

and it follows that $$f_L = f_o - B/2, \quad (4)$$

and $$f_H = f_o + B/2. \quad (5)$$

In that $t_D = N \cdot t_s$, from equation (1) it is evident that the bandwidth, B, the low frequency, $f_L$, and the high frequency, $f_H$, change with either or both $f_s$, the shift register 10 clock frequency and N, the number of bits in the shift register 10. Also, the clock pulse frequency, $f_s$, must always be much higher than the high frequency, $f_H$, (the highest frequency of the input data band) so as to minimize noise caused by clock-pulse phase jitter at the shift register 10 output.

For the interval of the transfer characteristic, FIG. 6, where $p=3$, i.e., equations (1)-(5), the center frequency, $f_o$, is defined as follows:

$$f_o = Bp/2 = 3B/2 = 3f_L/2 = 3f_H/4 \quad (6)$$

whereby $$f_L = \tfrac{2}{3} \cdot f_o \quad (7)$$

$$f_H = \tfrac{4}{3} \cdot f_o \quad (8)$$

The operation of the apparatus of FIG. 1 is explained in conjunction with waveforms in FIGS. 2, 3, 4, and 5, for the frequencies $f_o, f_L, f_H,$ and $f_3$.

In FIGS. 2-5, $a$ designates the waveforms at the output of band-pass filter 15, $b$ designates the waveforms at the output of the hard limiter 13, $c$ designates the waveform of the clock pulse signal applied to the synchronization input of shift-register delay line 10, $d$ designates the waveform at the output of shift-register delay line 10, $e$ designates waveforms at the output of the full-wave digital phase detector 14, and $g$ designates the waveform at the output of low-pass filter 18. Waveforms $b$ and *d* are applied to the inputs of the full-wave digital phase detector 14. Subscripts are used to indicate the frequency corresponding to the waveforms.

In operation, an input signal is applied to terminals 16, 17, and passed through the band-pass filter 15 to limit the frequencies contained therein to a predetermined input data band which, for the purposes of the present illustration, is coextensive with the null-to-peak interval of the transfer characteristic, FIG. 6, corresponding to $p=3$.

Referring to FIG. 2, waveform $a_o$ illustrates the sinusoidal waveform applied to hard limiter 13. Hard limiter 13 converts waveform $a_o$ to a two-level digital form, i.e., to a square wave $b_o$. Waveform $c$ illustrates the clock pulse input to the synchronization input to shift-register delay line 10. Clock pulse frequency $f_s$ is made equal to $72 \cdot f_o$ to minimize clock pulse phase jitter at the output of full-wave digital phase detector 14. It has been found that a $f_s$ that is 40 times the high frequency in the input data band is adequate to minimize clock pulse phase jitter.

For the purposes of the present illustration, shift-register delay line 10 is implemented with $N=54$ bits, whereby $$t_D = N \cdot 1/f_s = 54/72f_o = 3/4f_o = 1/2f_L \quad (9)$$

Waveform $d_o$ illustrates the waveform $b_o$ delayed by a period, $t_D$, which remains constant for all frequencies. The waveforms $b_o$ and $d_o$ are applied to digital phase detector 14, which by way of example is implemented as a full-wave digital phase detector. In this instance, digital phase detector H generates a signal of waveform $e_o$, defined as $b_o \cdot d_o + \overline{b_o} \cdot \overline{d_o}$ in Boolean terminology. Thus, when $b_o$ and $d_o$ are either both positive or both zero waveform $e_o$ is at unit level. The low-pass filter 18 "smoothes" waveform $e_o$ to generate the waveform $g_o$ which is of a DC amplitude substantially equal to ½E. This output is indicated by point 22 on the transfer characteristic of FIG. 6.

Figure 5:
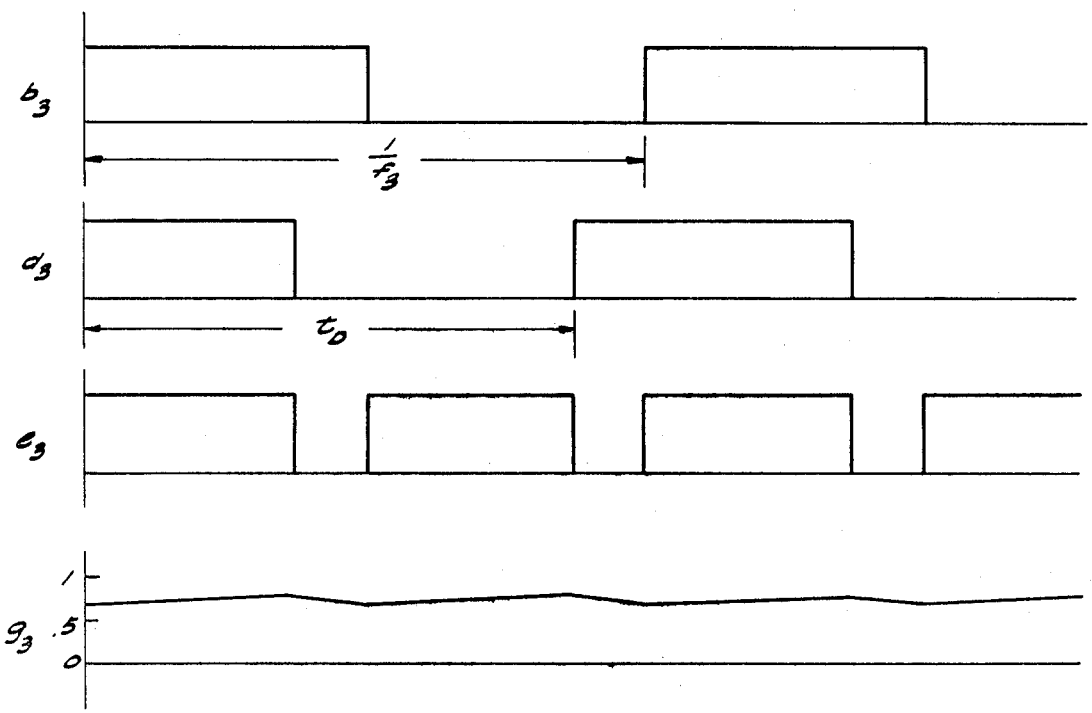

Referring to FIG. 3, there is illustrated waveforms $b_L$ and $d_L$ in response to a signal of frequency $f_L$. Waveform $d_L$ is 180° out of phase with waveform $b_L$, whereby there are no coextensive positive or zero voltages. Accordingly, the output of full-wave digital phase detector 14 is zero, whereby waveforms $e_L$ and $g_L$ are both zero. Point 23 designates the waveform $g_L$ on the transfer characteristic of FIG. 6. Similarly, FIGS. 4 and 5 illustrate waveforms $b_H$, $d_H$, and $g_H$ for a signal of frequency, $f_H$, and waveforms $b_3$, $d_3$, $e_3$, and $g_3$ for a signal of frequency, $f_3$. Points 24, 25 designate the amplitude of waveforms $g_H$, $g_3$, respectively, on the transfer characteristic of FIG. 6. Bandwidth, B, spans from $f_L$ to $f_H$ and is coextensive with the pass band of band-pass filter 15.

I claim:

1. A digital frequency discriminator comprising means responsive to an input signal including frequencies within an input data band width having a low frequency and a high frequency for converting said input signal to two-level digital form in accordance with the polarity of the respective alternations thereof;

digital means synchronized by a clock pulse signal having a repetition rate that is no less that 40 times greater than said high frequency for delaying said two-level signal by an interval substantially equal to one-half the period of said data bandwidth;

means responsive to both said delayed and undelayed two-level signals for generating a predetermined output voltage concurrent with each successive interval that said delayed and undelayed two-level signals have a common level; and means responsive to said successive predetermined output voltages for generating a direct current voltage of successive amplitudes proportional to the instantaneous frequency of said input signal.

2. An apparatus capable of generating a direct current voltage representative of successive frequencies within an input band of frequencies of an input signal, said apparatus comprising a hard limiter responsive to said input signal for generating a two-level digital signal according to the polarity of the successive alternations thereof;

a shift-register delay line connected to the output of said hard limiter and synchronized by a clock pulse signal having a repetition rate no less than 40 times the frequency at the upper extremity of said input band of frequencies, said shift-register delay line introducing a delay equal to one-half period of the data bandwidth;

a digital phase detector having inputs connected to outputs from said hard limiter and said shift register delay line; and a low-pass filter connected to the output from said digital phase detector thereby to produce said direct current voltage representative of the successive frequencies of said input signal.

3. The digital frequency discriminator as defined in claim 1 additionally including means for limiting the band width between said low frequency and said high frequency to no more than said bandwidth.

4. The apparatus capable of generating a direct current voltage representative of successive frequencies within an input band of frequencies of an input signal as defined in claim 2, additionally including a band-pass filter interposed between said hard limiter and the input thereto, said band-pass filter having a pass band that commences no lower than, and is no wider than said input band of frequencies.

* * * * *